US012764171B2

(12) United States Patent
Yau

(10) Patent No.: US 12,764,171 B2
(45) Date of Patent: Oct. 13, 2026

(54) SYSTEM AND METHODS FOR RESOURCE CONSERVATION DURING CALL HOLD

(71) Applicant: T-Mobile Innovations LLC, Overland Park, KS (US)

(72) Inventor: Hang Hoi Yau, Sammamish, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 37 days.

(21) Appl. No.: 18/921,540

(22) Filed: Oct. 21, 2024

(65) Prior Publication Data

US 2026/0113364 A1 Apr. 23, 2026

(51) Int. Cl.

| | |
|---|---|
| ***H04L 65/1069*** | (2022.01) |
| ***H04L 65/1053*** | (2022.01) |
| ***H04L 65/1096*** | (2022.01) |
| ***H04L 65/1104*** | (2022.01) |
| ***H04L 65/60*** | (2022.01) |

(52) U.S. Cl.

CPC ...... *H04L 65/1096* (2013.01); *H04L 65/1053* (2013.01); *H04L 65/1069* (2013.01); *H04L 65/1104* (2022.05); *H04L 65/60* (2013.01)

(58) Field of Classification Search

CPC ............. H04L 65/1096; H04L 65/1104; H04L 65/1053; H04L 65/1069; H04L 65/50; H04L 65/00; H04W 4/00; H04W 28/00; H04W 76/00; H04W 36/00; H04W 4/18; H04W 76/50; H04W 76/10; H04W 36/08

USPC .......................................................... 709/227

See application file for complete search history.

(56) References Cited

U.S. PATENT DOCUMENTS 6,853,719 B2 * 2/2005 McCormack ....... H04M 3/4285 379/215.01
8,229,099 B2 * 7/2012 LaCroix ............ H04M 3/42221 379/265.09
8,559,960 B2 10/2013 Gupta et al.
8,675,567 B2 * 3/2014 Lovsen ................. H04W 76/19 370/328
8,841,986 B2 * 9/2014 Holman ................. G08C 17/00 379/162
8,984,067 B2 * 3/2015 Lau ..................... H04L 65/1083 709/206
10,200,533 B2 * 2/2019 Kondapalli ......... H04M 3/4285
11,238,165 B2 * 2/2022 Ke ........................ H04L 9/0869
11,924,691 B2 * 3/2024 Chinthalapudi ...... H04W 76/16
2002/0122401 A1 * 9/2002 Xiang ................... H04W 76/16 370/352
2005/0141483 A1 6/2005 Wengrovitz
2006/0149811 A1 * 7/2006 Bennett ................... H04L 67/14 709/203
2013/0003566 A1 * 1/2013 Munoz de la Torre Alonso ......... H04W 76/22 370/252

(Continued)

*Primary Examiner* — Sargon N Nano

(74) *Attorney, Agent, or Firm* — Jones Burke, PLLC

(57) ABSTRACT

Systems, methods and devices are provided for transmitting, by a wireless device, a call request to a private branch exchange (PBX) using a wireless network, establishing data and signal sessions between the wireless device and the PBX using the wireless network based on the call request, pausing the data session and playing a media file by the wireless device, receiving, at the wireless device, an instruction set from the wireless network and, in response to receiving the instruction set, resuming the data session and stopping playback of the media file by the wireless device.

20 Claims, 6 Drawing Sheets

(56) References Cited

U.S. PATENT DOCUMENTS

| | | | | |
|---|---|---|---|---|
| 2013/0016658 | A1* | 1/2013 | Lovsen | H04W 76/19<br>370/328 |
| 2013/0188601 | A1* | 7/2013 | Sun | H04W 60/005<br>370/331 |
| 2014/0051457 | A1* | 2/2014 | Zhao | H04W 76/34<br>455/452.2 |
| 2017/0070921 | A1* | 3/2017 | Lau | H04W 76/36 |
| 2018/0184336 | A1* | 6/2018 | Keller | H04W 4/24 |
| 2019/0141776 | A1* | 5/2019 | Kim | H04W 76/20 |
| 2020/0267606 | A1* | 8/2020 | Huang-Fu | H04W 28/0257 |
| 2021/0014724 | A1* | 1/2021 | Brown | H04W 76/12 |

* cited by examiner

400

SYSTEM AND METHODS FOR RESOURCE CONSERVATION DURING CALL HOLD

TECHNICAL BACKGROUND

During an IP based call to a private branch exchange (PBX), such as through voice over LTE (VoLTE) or voice over new radio (VoRN), a data session is established for the voice call. When the call is placed on hold by customer service at the PBX, the quality of service for that call must be maintained even while the call is on hold. Maintaining the quality of service for the data session during the hold may be wasteful as no voice data is being transmitted during that time.

Overview

Exemplary embodiments described herein include methods, system and processing nodes for resource conservation during a call hold. An exemplary method includes transmitting, by a wireless device, a call request to a private branch exchange (PBX) using a wireless network. The method also includes establishing data and signal sessions between the wireless device and the PBX, and pausing the data session and playing a media file by the wireless device. The method further includes receiving, at the wireless device, an instruction set from the wireless network and, in response to receiving the instruction set, resuming the data session and stopping playback of the media file by the wireless device.

Further exemplary embodiments include a system for resource conservation during a call hold. The system includes a wireless network. The system additionally includes a computing device including a processor configured to transmit a call request to a private branch exchange (PBX) using the wireless network and establish data and signal sessions between the computing device and the PBX using the wireless network based on the call request. The processor is further configured to pause the data session and play a media file, receive an instruction set from the wireless network and, in response to receiving the instruction set, resume the data session and stop playback of the media file.

In a further exemplary embodiment, a non-transitory computer readable medium is provided. The non-transitory computer-readable medium stores instructions, when executed by a processor, configuring the processor to transmit a call request to a private branch exchange (PBX) using the wireless network, establish data and signal sessions between a wireless device and the PBX using the wireless network based on the call request, pause the data session and play a media file, receive an instruction set from the wireless network and, in response to receiving the instruction set, resume the data session and stop playback of the media file.

DETAILED DESCRIPTION

When a call is placed on hold, no voice data is being transmitted. Thus, it is unnecessary to adhere to the quality of service (QoS) requirements for that stage of the call. However, current systems will still maintain the data session for that call. For example, the data session and QoS requirements are maintained if only hold music or a hold message are being transmitted from the PBX to the user device, without any live voice interaction between the systems.

As modern IP based network infrastructures, such as VoLTE and VoRN, enable data files, such as media files, to be transmitted between the PBX and a wireless device, a PBX may be able to transmit an audio file, that includes the songs or recorded message which are played during the hold, to be played locally at the wireless device while the call is on hold. By playing the file locally, a dedicated bearer for the data session may no longer be needed to be maintained during the hold, while only a less resource intensive default bearer is maintained.

Exemplary embodiments described herein include methods and systems for providing resources conservation during the hold by transmitting a file to be played by a wireless device and pausing the data session while the call hold is in place. For example, a PBX may transmit an audio file and based on a hold signal, a wireless network may terminate the dedicated bearer. During this hold, the wireless device plays the hold music or message while the wireless network only needs to maintain the default bearer for the signal session.

These and other examples will be described in greater detail below in relation to FIGS. 1-6.

Figure 1:
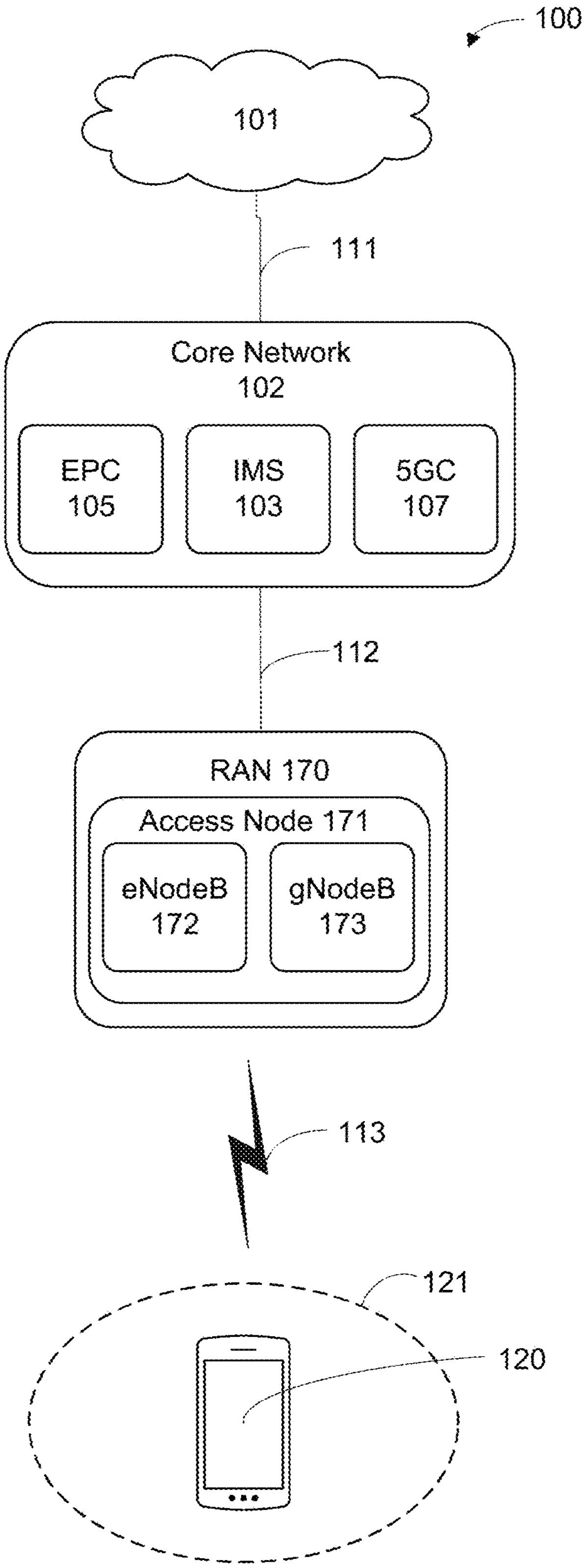
FIG. 1 illustrates an exemplary system for data resource transmission in accordance with disclosed embodiments.

FIG. 1 depicts an exemplary system 100 for data resource transmission. System 100 includes a communication network 101, a core network 102, a radio access network (RAN) 170 and at least one wireless device 120.

Core network 102 is connected to communication network 101 over communication link 111. Core network 102 includes an IP multimedia subsystem (IMS) 103. IMS 103 as used herein is a framework used for delivering IP multimedia services, such as voice over LTE (VoLTE), voice over New Radio (VoRN) services, and/or other similar services, across a network. In embodiments, IMS 103 is used for session control, signaling and routing in multimedia communication. Sessions may include signaling sessions, voice sessions, data sessions and the like. In embodiments, IMS 103 may be used for communication between entities or components of network 101 and wireless device 120. For example, IMS 103 may be used for establishing a dedicated bearer for a data session.

Core network 102 also includes an evolved packet core (EPC) 105 and a 5G core (5GC) 107. EPC 105 as used herein are core network components used for managing data for LTE, 4G, and/or other networks. 5GC 107 as used herein are core network components used for managing data for 5G networks. It should be noted that core network 102 may include other components used for managing data for networks not described herein, such as a satellite core network.

The RAN 170 includes at least one access node 171. In embodiments, the at least one access node 171 may include an evolved Node B (eNodeB) 172 and a next generation Node B (gNodeB) 173. As used herein, eNode B 172 is a base station in LTE/4G networks used for connecting a user device, such as wireless device 120, to core network 102. gNodeB 173, as used herein, is a base station in 5G networks and/or other networks used for connecting a user device to core network 102. The gNodeB 173 may include, for example, centralized units (CUs) and distributed units (DUs).

RAN 170 is connected to core network 102 over communication link 112. RAN 170 may include other devices and additional nodes not described herein. For example, RAN 170 may include devices used for forwarding media files over IP from wireless device 120 to core network 102.

System 100 also includes a wireless device 120. In embodiments, system 100 may include multiple wireless devices. Wireless device 120 is configured to operate in one or more coverage areas 121. Wireless device 120 may be an end-user wireless device. Wireless device 120 may include any device configured to send and receive text messages. In embodiments, wireless device 120 communicates with RAN 170 over communication link 113. Examples of communication link 113 may include 5G network, 4G LTE, and the like.

Communication network 101 may be wired and/or wireless communication network. In embodiments, communication network 101 may include processing nodes, routers, gateways, physical and/or wireless data links for carrying data among various network elements, including combinations thereof. In embodiments, communication network 101 may include a local area network, a wide area network, an inter-network, such as the internet, and the like. Communication network 101 may be capable of carrying data, such as, for example, to support multimedia files, and data communications by wireless device 120. Wireless network protocols can include multimedia broadcast multicast service (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE), 6G and/or non-terrestrial networks. Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), Asynchronous Transfer Mode (ATM), and/or so forth. Communication network 101 may also include additional base stations, controller nodes, telephony switches, internet routers, network gateways, computer systems, communication links, or some other type of communication equipment, and combinations thereof. The core network 102 includes core network functions and elements. The core network 102 may be structured using a service-based architecture (SBA). The network functions and elements may be separated into user plane functions and control plane functions. In an SBA architecture, service-based interfaces may be utilized between control-plane functions, while user-plane functions connect over point-to-point link. The user plane function (UPF) accesses a data network, such as network 101, and performs operations such as packet routing and forwarding, packet inspection, policy enforcement for the user plane, quality of service (QoS) handling, etc. The control plane functions may include, for example, a network slice selection function (NSSF), a network exposure function (NEF), a network repository function (NRF), a policy control function (PCF), a unified data management (UDM) function, an application function (AF), an access and mobility function (AMF), an authentication server function (AUSF), and a session management function (SMF). Additional or fewer control plane functions may also be included. The AMF receives connection and session related information from the wireless devices 120 and is responsible for handling connection and mobility management tasks. The SMF is primarily responsible for creating, updating, and removing sessions and managing session context. The UDM function provides services to other core functions, such as the AMF, SMF, and NEF. The UDM may function as a stateful message store, holding information in local memory. The NSSF can be used by the AMF to assist with the selection of network slice instances that will serve a particular device. Further, the NEF provides a mechanism for securely exposing services and features of the core network.

Although one core network 102 is shown, multiple core networks 102 may be utilized. Alternatively, the single core network 102 may include a distributed, cloud-native, converged core gateway. Thus, the converged core gateway could connect EPC 105 to 5GC 107 network.

Communication links 111 and 112 can use various communication media, such as air, space, metal, optical fiber, or some other signal propagation path, including combinations thereof. Communication links 111 and 112 can be wired or wireless and use various communication protocols such as Internet, Internet protocol (IP), local-area network (LAN), S1, optical networking, hybrid fiber coax (HFC), telephony, T1, or some other communication format-including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, 6G or combinations thereof. Other wireless protocols can also be used. Communication links 111 and 112 can be direct links or might include various equipment, intermediate components, systems, and networks, such as a cell site router, etc. Communication links 111 and 112 may comprise many different signals sharing the same link.

In embodiments, RAN 170 may include various access network systems and devices such as access node 171. The RAN 170 is disposed between the core network 102 and the end-user wireless device 120. Components of the RAN 170 may communicate directly with the core network 102 and others may communicate directly with the end user wireless device 120. The RAN 170 may provide services from the core network 102 to the end-user wireless device 120. It is understood that the disclosed technology may also be applied to communication between an end-user wireless device and other network resources, such as relay nodes, controller nodes, antennas, etc. Further, multiple access nodes may be utilized. For example, some wireless devices may communicate with eNodeB 172 and others may communicate with gNodeB 173.

In additional embodiments, access nodes may comprise two co-located cells, or antenna/transceiver combinations that are mounted on the same structure. Alternatively, access node 171 may comprise a short range, low power, small-cell access node such as a microcell access node, a picocell access node, a femtocell access node, or a home eNodeB device. As will be further described below, functionality for multimedia transmission may be included within the access nodes. Access node 171 can be configured to deploy one or more different carriers, utilizing one or more RATs. For example, gNodeB 173 may support NR and an eNodeB 172 may provide LTE coverage. It would be evident to one of ordinary skill in the art, in light of this disclosure, the many other combinations of access nodes and carriers that could be deployed.

The access node 171 may include a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless device 120 may include any wireless device included in a wireless network. For example, the term "wireless device" may include a relay node, which may communicate with an access node. The term "wireless device" may also include an end-user wireless device, which may communicate with the access node 171 through the relay node. The term "wireless device" may further include an end-user wireless device that communicates with the access node 171 directly without being relayed by a relay node.

Wireless device 120 may be any device, system, combination of devices, or other such communication platform capable of communicating wirelessly with access network 171 using one or more frequency bands and wireless carriers deployed therefrom. Each of wireless devices 120, may be, for example, a mobile phone, a wireless phone, a wireless modem, a personal digital assistant (PDA), a voice over internet protocol (VoIP) phone, a voice over packet (VOP) phone, or a soft phone, an internet of things (IoT) device, as well as other types of devices or systems that can send and receive audio or data. The wireless device 120 may be or include high power wireless devices or standard power wireless devices. Other types of communication platforms are possible.

System 100 may further include many components not specifically shown in FIG. 1 including processing nodes, controller nodes, routers, gateways, and physical and/or wireless data links for communicating signals among various network elements. System 100 may include one or more of a local area network, a wide area network, and an internetwork, such as the internet. System 100 may be capable of communicating signals and carrying data, for example, to support voice, push-to-talk, broadcast video, and data communications by end-user wireless device 120. System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the RAN 170 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of system 100 may be, comprise, or include computers systems and/or processing nodes, including access nodes, controller nodes, and gateway nodes described herein.

The operations for data resource transmission may be implemented as computer-readable instructions or methods, and processing nodes on the network and/or computing device, such as end user wireless device, for executing the instructions or methods. The processing node may include a processor included in the access node or a processor included in any controller node in the wireless network that is coupled to the access node. The computing device may include at least a processor and a memory with instructions configuring the processor to execute instructions.

Figure 2:
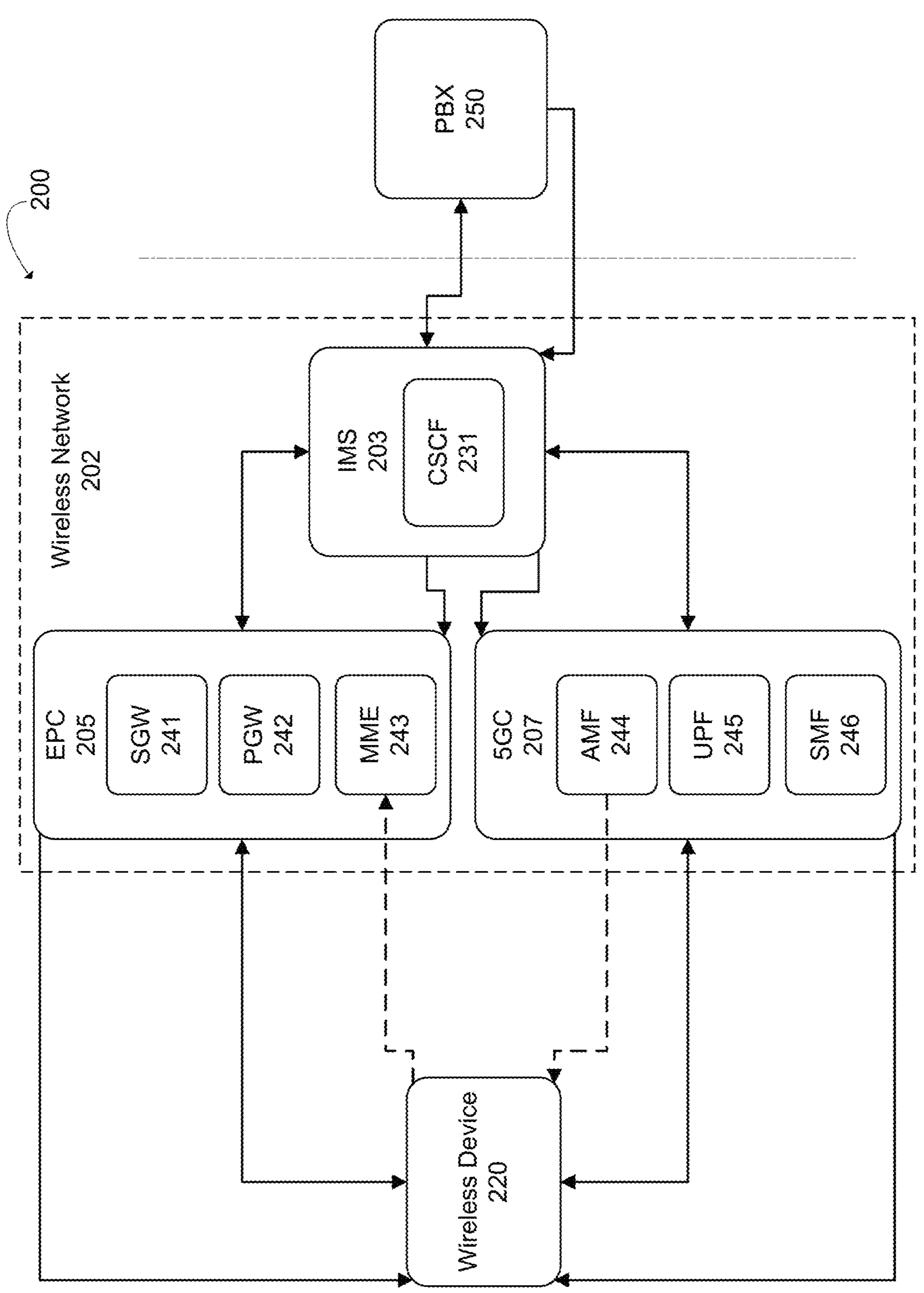
FIG. 2 illustrates an additional exemplary system for resource conservation in accordance with disclosed embodiments.

Now referring to FIG. 2, an exemplary system 200 for resource conservation is presented. System 200 includes a wireless device 220. Wireless device 220 may be the same as wireless device 120. System 200 also includes wireless network 202. Wireless network 202 may include a RAN, core network and/or a communication network, which may be the same as, respectively, RAN 170, core network 102 and communication network 101. Wireless network 202 includes services and components used by a wireless network for handling voice and data transmissions. Wireless network 202 includes IMS 203, EPC 205 and 5GC 207. IMS 203, EPC 205 and 5GC 207 may be the same as IMS 103, EPC 105 and 5GC 107, respectively.

System 200 also includes a private branch exchange (PBX) 250. As used herein, PBX 250 is a telecommunication system that integrates IP based networks to manage voice, video and data communications within an organization. Wireless network 202 connects to PBX 250 through a communication link. The communication link may include communication link 111 described in reference to FIG. 1. PBX 250 may use session initiation protocol (SIP) trunking to connect to IMS 203, which allows PBX 250 to send and receive voice and multimedia data over an IP network. PBX 250 may use SIP and session description protocol (SDP) for managing session and session parameters.

In embodiments, IMS 203 includes a call session control function (CSCF) 231. CSCF 106 as used herein is a component of IMS 203 used for session control, signaling and routing in multimedia communication. In embodiments, CSCF 231 is used for handling SIP communication. For example, CSCF 231 may handle SIP session signaling, including ensuring session description protocol (SDP) media parameters are correctly handled, such as for media being transmitted between PBX 250 and wireless device 220.

In instances, once a multimedia connection, in this example they may include a VoLTE or VoRN connection, a dedicated bearer is established for the data session. It should be noted that a default bearer is also established for a signal session for the SIP communication between wireless device 220 and PBX 250.

In embodiments, EPC 205 includes serving gateway (SGW) 241, packet data network gateway (PGW) 242 and mobility management entity (MME) 243. EPC 205 may include other components not described herein.

In an example where VoLTE is used, wireless device 220 transmits an initial request to PBX 250 for a multimedia session, through EPC 205 and IMS 203. Once an SIP confirmation is received by wireless device 220 from PBX 250, or an application server (AS) associated with PBX 250, MME 243 transmits a bearer resource request to IMS 203 to establish a dedicated bearer for the data session. Once the dedicated bearer is established, data session communication continues through IMS 203. FIG. 2 show this communication as arrows going between the wireless device 220, through EPC 205 and IMS 203, and the PBX 250.

Continuing with this example, in the event of the call being placed on hold by PBX 250, PBX 250 uses SIP signaling through CSCF 231, such as SIP update or re-invite, with changes in the SDP parameters for the connection. With this transmission, PBX 250 additionally transmits a data file to wireless device 220. For example, PBX 250 may transmit the data file using a real-time transport protocol (RTP) or secure RTP (SRTP). Upon receiving the data file, by wireless device 220, MME 243 terminates the dedicated bearer with the IMS 203. It should be noted that although the dedicated bearer is terminated, the signal session between wireless device 220 and PBX 250 is maintained through the default bearer. Because quality of service for the data session no longer needs to be maintained for the call, since the dedicated bearer is no longer active, the resources required by wireless network 202 for connection between the wireless device 220 and PBX 250 is greatly reduced. The transmission of the hold signal and the data file is shown by the arrows going from the PBX 250, through IMS 203 and EPC 205, to the wireless device 220.

In embodiments, 5GC 207 includes access and mobility management function (AMF) 244, user plane function (UPF) 245 and session management function (SMF) 246. 5GC may include other components not described herein, such as policy control function (PCF) for managing policy related decisions.

In an example where VoRn is used, similar to the VoLTE example wireless device 220 transmits an initial request to PBX 250 for a multimedia session, through 5GC 207 and IMS 203. Once PBX 250 receives the SIP request, through IMS 203, PBX or an application server (AS) associated with PBX 250 transmit a confirmation back to wireless device 220. Once SIP connection is confirmed, AMF 244 receives a request for establishing a default QoS flow, with IMS 203, for SIP signaling with PBX 250. AMF 244 and SMF 246 may be used for establishing the QoS flow with IMS 203. Once the QoS flow is established, UPF 245 establishes a dedicated bearer for the data session. Similar to that described above in reference to a VoLTE connection, FIG. 2 show this communication as arrows going between the wireless device 220, through 5GC 207 and IMS 203, and the PBX 250.

Continuing with this example, similar to the VoLTE example, in the event of the call being placed on hold by PBX 250, PBX 250 uses SIP signaling through CSCF 231, with changes in the SDP parameters for the connection and additionally transmits a data file to wireless device 220. In an example, PBX 250 may transmit the data file using a real-time transport protocol (RTP) or secure RTP (SRTP) Upon receiving the data file, by wireless device 220, SMF246/UPF 245 terminates the dedicated bearer with the IMS 203. As mentioned above, it should be noted that although the dedicated bearer is terminated, the signal session between wireless device 220 and PBX 250 is maintained through the default bearer. The transmission of the hold signal and the data file is shown by the arrows going from the PBX 250, through IMS 203 and 5GC 207, to the wireless device 220.

In both an example that uses VoLTE and an example that uses VoRN, once the call is no longer on hold, PBX 250 sends a signal to wireless device 220, for example through the signal session of the SIP communication, to re-establish the dedicated bearer for data session. Once wireless device 220 receives the end of hold signal, wireless network 202 performs the same steps described above for establishing a dedicated bearer. In some embodiments, wireless device 220 may be configured to stop execution of data file once new dedicated bearer is established. In an instance, the data file may be an audio file. For example, audio file may include one or more songs that play at the wireless device 220 while call is on hold.

In some embodiments, 5GC 207 may be configured to implement an evolved packet system (EPS) fallback. As used herein, EPS fallback is a feature of wireless network 202 that switches between utilizing 5GC 207 to utilizing EPC 205 components without terminating the established sessions. For example, if connectivity between the wireless device 220 and the PBX 250 through a 5G system (5GS), which includes 5GC 207 and other components of wireless network 202 such as gNodeBs, becomes unreliable, AMF 244 transmits a signal to wireless device 220 to switch connection to EPS, which includes EPC 205 and its related nodes, such as eNodeB. Once the wireless device 220 switches to EPS, MME 243 receives context for the ongoing sessions from AMF 244. This example EPS fallback is shown by dashed arrow line in FIG. 2. It should be noted that other components may be involved in the EPS fallback process. For example, UPF 245 may also transfer user plane context to EPC 205, where SGW 241 and PGW 242 may ensure that default bearer, such as for signaling session, is maintained and/or may have ensure EPC 205 has proper context to establish a dedicated bearer. It should be noted that SGW 241 and PGW 242 may also be used for maintaining a dedicated bearer, if the dedicated bearer has not been disabled yet. The process which involves the disabling and establishing of dedicated bearer for data session will be described in more detail in reference to FIG. 3.

Figure 3:
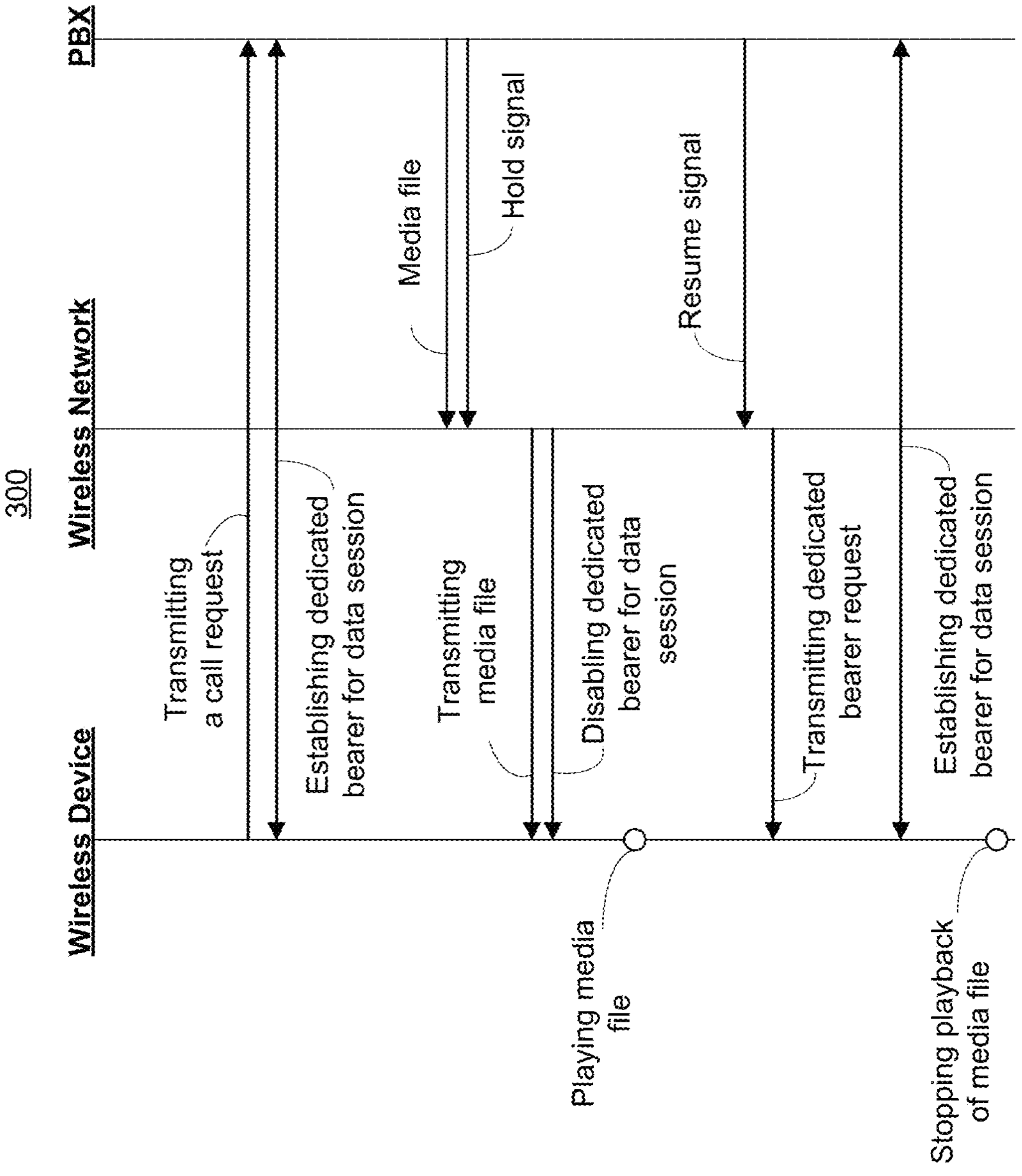
FIG. 3 illustrates an exemplary time series showing the conservation of data resources during a call hold in accordance with disclosed embodiments.

Now referring to FIG. 3, an example time series flow 300 is presented. In this example, the flow begins with a wireless device transmitting a call request to a PBX using a wireless network. In this example, the call request may be a VoLTE or a VoRN call. As noted above, VoLTE and VoRN are used as examples for ease of description. As such other data telecommunication technologies may be used which are not described herein. Once the call request is successfully received by the PBX, the flow continues by establishing a dedicated bearer, by the wireless network, for data session. For example, as described above in reference to FIG. 2, the wireless device may transmit a request to establish a dedicated bearer to the wireless network.

Once the dedicated bearer is established for data session, the data communication, such as voice over IP, continues until the PBX transmits a media file followed by a hold signal. This order is provided only as an example for ease of description. In other examples, hold signal may be transmitted prior to the media file or they may be transmitted virtually simultaneously. Virtually simultaneously is used to describe two or more events occurring at such closeness in time to each other that they are perceived as being happening at the same time.

Once wireless network receives the media file and the hold signal, the flow continues by the wireless network transmitting the media to the wireless device and disabling the dedicated bearer for the data session. In an embodiment, the media file transmission may include instructions to auto-play the media file. For example, the parameters of the SDP associated with the media file may include instructions to automatically play the media file. As mentioned above, the wireless device continues to be in SIP communication with PBX through default bearer.

Once receiving the media file. The flow continues by wireless device playing the media file. Media file may include an audio file. For example, media file may be an audio file, such as music or a recorded message, that is continuously played while call is on hold. For example, the wireless device may continue playing the audio file for as long that there is SIP connection with PBX and no other signal exiting from the hold is sent.

Once hold is lifted, PBX sends a resume signal to wireless network. As mentioned above, resume signal may include an SIP update or re-invite. Once the resume signal is received, the flow continues by the wireless network transmitting a new dedicated request.

Once the request is accepted, the flow continues by the wireless network establishing a new dedicated bearer for the data session. In some embodiments, wireless device may transmit a new request for establishing a bearer for the data session based on accepting the request from the wireless network. In some embodiments, wireless network may establish the bearer for the data session based on the request being accepted by the wireless device.

Once the new bearer is established for the data session, the flow ends by the wireless device stopping playback of the media file. In some embodiments, wireless device may delete media file upon stopping playback. In some embodiments, wireless device may delete media file upon termination of the signal session with PBX. For example, the wireless device may be configured to play the media file again upon a new hold signal being sent by PBX. In this example, if a new hold is generated, no new file is transmitted, and instead the wireless device plays the same media file previously transmitted.

Figure 4:
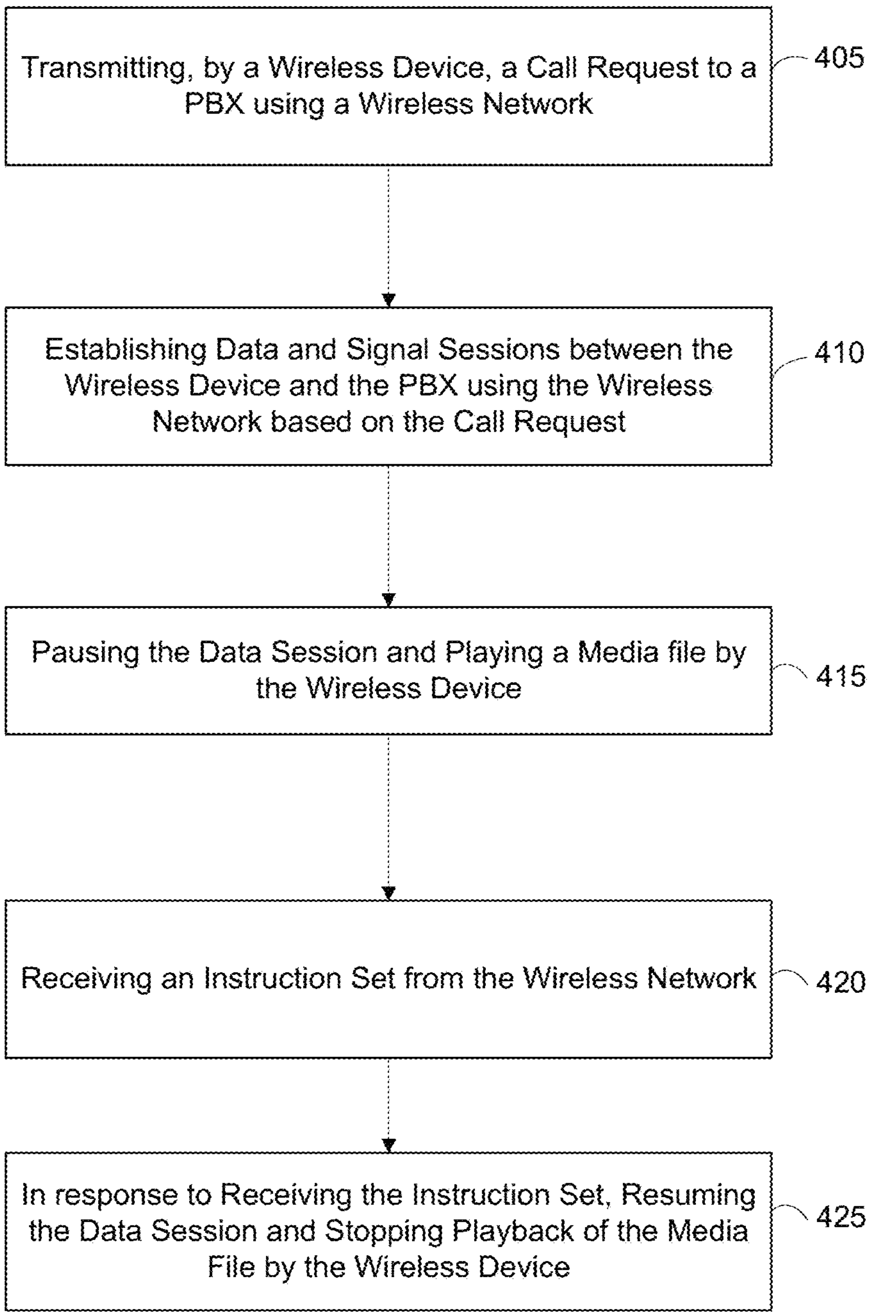
FIG. 4 illustrates an exemplary method for resource conservation during a call hold in accordance with disclosed embodiments.

Now referring to FIG. 4, an example flow diagram of a method 400 for resource conservation during a call hold is presented. At step 405, method 400 includes transmitting, by a wireless device, a call request to a PBX using a wireless network.

At step 410, method 400 includes establishing data and signal sessions between the wireless device and the PBX using the wireless network based on the call request. In embodiments, establishing the signal sessions may include using a session initiation protocol (SIP). In some embodiments, establishing the data session may include using real-time protocol (RTP) or secure real-time protocol (SRTP).

Method 400, at step 415, includes pausing the data session and playing a media file by the wireless device. The data session may be paused in response to a hold signal from the PBX. In embodiments, method 400 may include receiving, at the wireless device, the media file and associated instructions. In embodiments, the associated instructions may include instructions to play the media file. In some embodiments, method 400 may include pausing the data session and playing the media file in response to receiving the media file and associated instructions. In further embodiments, the media file may be an audio file. For example, the audio file may include songs and/or recorded message configured to play while a user is on a call hold. In some embodiments, the media file and associated instructions are received based on a hold signal from the PBX.

At step 420, method 400 includes receiving an instruction set from the wireless network. In embodiments, the instruction set includes a dedicated bearer request for the data session. In embodiments, method 400 may include receiving the instructions set based on an end of hold signal from the PBX.

Method 400, at step 425, includes, in response to receiving the instruction set, resuming the data session and stopping execution of the media file by the wireless device. In some embodiments, method 400 may include deleting the media file. In embodiments, method 400 may further include deleting the media file after termination of the signal session.

Figure 5:
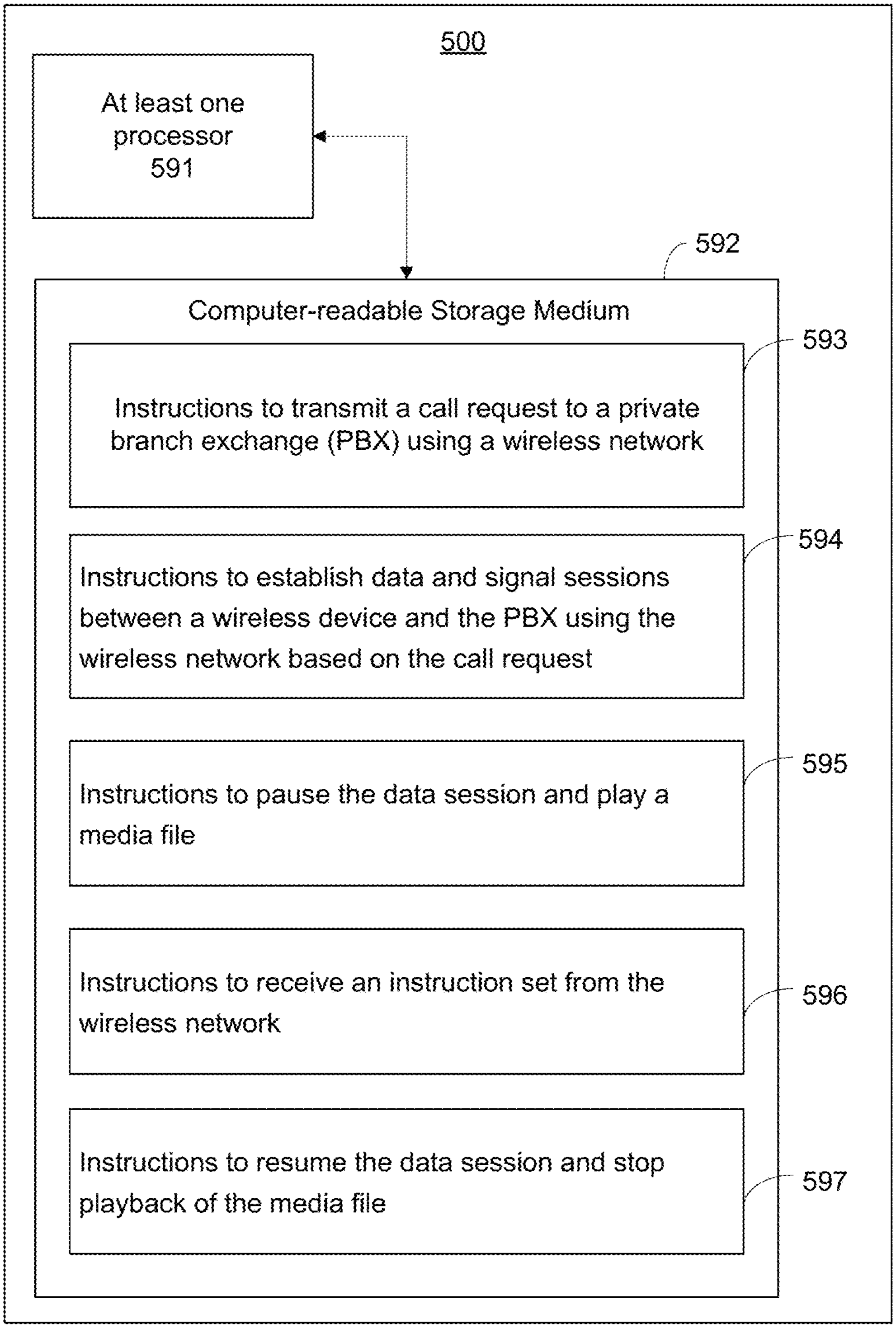
FIG. 5 illustrates an example of a computing device in accordance with aspects of this disclosure.

Now referring to FIG. 5, an example computing device 500 is presented. In this example, computing device 500 includes at least one processor 591 communicably coupled to a computer-readable storage medium 592. The at least one processor 591 may include a microprocessor, a microcontroller, one or more central processing unit (CPU) cores, an application-specific integrated circuit (ASIC), one or more graphical processing unit (GPU) cores, a field programmable gate array (FPGA), and/or any other hardware device suitable for retrieval and execution of instructions from computer-readable storage medium 592. In instances, at least one processor 591 may include electronic circuitry for performing instructions described in this disclosure.

In instances, computer-readable storage medium 592 may be any medium suitable for storing executable instructions. In examples, without limitation, computer-readable storage medium 592 may include random access memory (RAM), read-only memory (ROM), electrically erasable programmable read-only memory (EEPROM), hard disk drive (HDD), solid state drive (SSD), optical disc, and the like. Computer-readable medium storage 592 may be disposed within computing device 500. In embodiments, computer-readable storage medium 592 may external, and communicably connected, to computing device 500. The instruction stored on computer-readable storage medium may be used to implement method steps described in reference to FIG. 4.

In this example, computer-readable storage medium 592 is encoded with set of instructions 593-597. In embodiments, executable instructions included in each block may be included in different blocks shown and blocks not shown. In embodiments, computer-readable storage medium 592 may include additional set of instructions not illustrated in this example.

Instruction 593, when executed by at least one processor 591, configures the at least one processor 591 to transmit a call request to a private branch exchange (PBX) using a wireless network, such as wireless network 202.

Instruction 594, when executed by at least one processor 591, configures the at least one processor 591 to establish data and signal sessions between a wireless device and the PBX using the wireless network based on the call request.

Instruction 595, when executed by at least one processor 591, configures the at least one processor 591 to pause the data session and play a media file. In embodiments, the media file may be an audio file.

Instruction 596, when executed by at least one processor 591, configures the at least one processor 591 to receive an instruction set from the wireless network.

Instruction 596, when executed by at least one processor 591, configures the at least one processor 591 to resume the data session and stop playback of the media file.

In embodiments, computer-readable storage medium 592 may encoded with instructions configuring the at least one processor 591 to receive the executable file and associated instructions from the wireless network and, in response to receiving the instruction set, resume the data session and stop execution of the executable file.

Figure 6:
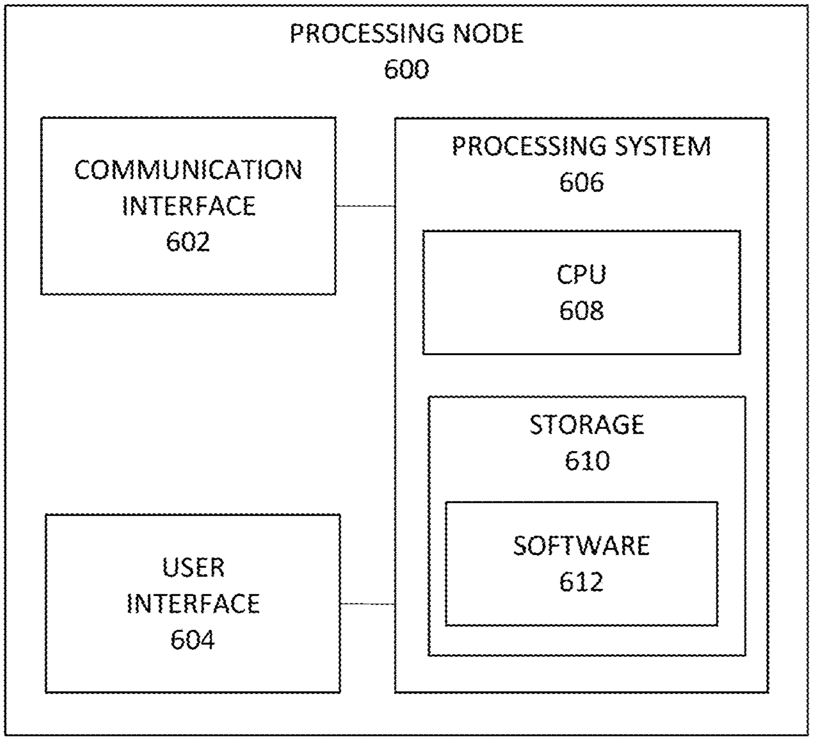
FIG. 6 illustrates an example of a processing node in accordance with aspects of this disclosure.

Now referring to FIG. 6, an example processing node 600, which may be configured to perform the methods and operations disclosed herein for selective attestation for emergency calls. The processing node 600 includes a communication interface 602, user interface 604, and processing system 606 in communication with communication interface 602 and user interface 604. Communication interface 602 may include hardware components, such as network communication ports, devices, routers, wires, antenna, transceivers, etc. User interface 604 may include hardware components, such as touch screens, buttons, displays, speakers, etc.

Processing system 606 includes a central processing unit (CPU) or processor 608, storage 610, which can comprise a disk drive, flash drive, memory circuitry, or other memory device including, for example, a buffer. Storage 610 can store software 612 which is used in the operation of the processing node 600. Software 612 may include computer programs, firmware, or some other form of machine-readable instructions, including an operating system, utilities, drivers, network interfaces, applications, or some other type of software. Processing system 606 may include a processor 608 and other circuitry to retrieve and execute software 612 from storage 610, which may be internal or external to the processing system 606. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600. Processing node 600 may be included in various elements of the wireless network including an access node, proxy call session control function (P-CSCF), emergency call session control function (E-CSCF), gateway mobile location center (GMLC), secure telephone identity authentication service (STI-AS), session border controller (SBC), or PBX for example. In this example, software 612 may include the instructions described in reference to FIG. 5.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices. Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid-state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not all be within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, the method comprising:

transmitting, by a wireless device, a call request to a private branch exchange (PBX) using a wireless network;

establishing data and signal sessions between the wireless device and the PBX using the wireless network based on the call request;

pausing the data session and playing a media file by the wireless device, wherein pausing the data session comprises terminating a dedicated bearer for the data session while maintaining a default bearer for the signal session;

receiving, at the wireless device, an instruction set from the wireless network; and in response to receiving the instruction set, resuming the data session and stopping playback of the media file by the wireless device, wherein resuming the data session comprises establishing a new dedicated bearer for the data session.

2. The method of claim 1, the method further comprising:

receiving, at the wireless device, the media file and associated instructions from the wireless network; and in response to receiving the media file and associated instructions, pausing the data session and playing the media file by the wireless device.

3. The method of claim 2, wherein the associated instructions is an session description protocol (SDP) parameter.

4. The method of claim 1, wherein the media file is an audio file.

5. The method of claim 1, wherein establishing the signal session comprises using a session initiation protocol (SIP).

6. The method of claim 1, wherein the media file is transmitted using a real-time protocol (RTP) or secure real-time protocol (SRTP).

7. The method of claim 2, wherein the media file and associated instructions are received based on a hold signal from the PBX.

8. The method of claim 7, wherein the instruction set is received based on an end of hold signal from the PBX.

9. The method of claim 1, wherein the wireless device further deletes the media file in response to receiving the instruction set.

10. The method of claim 1, wherein the data and signal sessions are established for voice over LTE (VoLTE) communication.

11. The method of claim 1, wherein the data and signal sessions are established for voice over New Radio (VoNR) communication.

12. A system, the system comprising:

a wireless network;

a computing device communicatively connected to the wireless network, wherein the computing device comprises at least one processor configured to:

transmit a call request to a private branch exchange (PBX) using the wireless network;

establish data and signal sessions between the computing device and the PBX using the wireless network based on the call request;

pause the data session and play a media file, wherein pausing the data session comprises terminating a dedicated bearer for the data session while maintaining a default bearer for the signal session;

receive an instruction set from the wireless network; and in response to receiving the instruction set, resume the data session and stop execution of the media file, wherein resuming the data session comprises establishing a new dedicated bearer for the data session.

13. The system of claim 12, wherein the computing device is further configured to:

receive the media file and associated instructions from the wireless network; and in response to receiving the instruction set, resume the data session and stop playing the media file.

14. The system of claim 12, wherein the media file is an audio media file.

15. The system of claim 12, wherein the computing device is configured to establish the signal session using a session initiation protocol (SIP).

16. The system of claim 12, wherein the media file is transmitted using a real-time protocol (RTP) or secure real-time protocol (SRTP).

17. The system of claim 13, wherein the media file and associated instructions are received based on a hold signal from the PBX.

18. The system of claim 17, wherein the instruction set is received based on an end of hold signal from the PBX.

19. A non-transitory computer-readable medium storing instructions, when executed by at least one processor, configuring the at least one processor to:

transmit a call request to a private branch exchange (PBX) using a wireless network;

establish data and signal sessions between a wireless device and the PBX using the wireless network based on the call request;

pause the data session and play a media file, wherein pausing the data session comprises terminating a dedicated bearer for the data session while maintaining a default bearer for the signal session;

receive an instruction set from the wireless network; and in response to receiving the instruction set, resume the data session and stop playback of the media file, wherein resuming the data session comprises establishing a new dedicated bearer for the data session.

20. The non-transitory computer-readable medium storing instructions of claim 19, wherein the at least one processor is further configured to:

receive the media file and associated instructions from the wireless network; and in response to receiving the instruction set, resume the data session and stop playback of the media file.

* * * * *